United States Patent [19]

Cataldo et al.

[11] 4,220,354
[45] Sep. 2, 1980

[54] PASSIVE SEAT BELT SYSTEM

[75] Inventors: Roy S. Cataldo, Birmingham; Theodore M. Salamon, Sterling Heights, both of Mich.

[73] Assignee: General Motors Corporation, Detroit, Mich.

[21] Appl. No.: 33,759

[22] Filed: Apr. 27, 1979

[51] Int. Cl.³ .............................................. B60R 21/10
[52] U.S. Cl. ................................... 280/803; 280/808; 297/469
[58] Field of Search ............... 280/803, 802, 801, 808; 297/468, 469

[56] References Cited

U.S. PATENT DOCUMENTS

| 3,827,713 | 8/1974 | Sakurai et al. | 280/803 |
| 4,124,224 | 11/1978 | Matsuoka | 280/807 |
| 4,159,834 | 7/1979 | Miller et al. | 280/802 |
| 4,175,773 | 11/1979 | Miller | 280/803 |

FOREIGN PATENT DOCUMENTS 2261374 7/1974 Fed. Rep. of Germany ........... 280/802

Primary Examiner—Robert R. Song
Assistant Examiner—Donn McGiehan
Attorney, Agent, or Firm—Charles E. Leahy

[57] ABSTRACT

A passive occupant restraint system includes a shoulder belt retractor mounted inboard the occupant seat for winding the inboard end of a shoulder belt having an outboard end attached to the upper rear corner of the door. A lap belt has an outboard end mounted on the door by a lap belt retractor and an inboard end mounted on the shoulder belt by a latch plate which is slidably movable along the shoulder belt by manual effort of the occupant. The latch plate remains relatively stationary on the shoulder belt during winding and unwinding of the shoulder belt upon door movement so that the occupant may position the latch plate generally adjacent the outboard end of the shoulder belt to stow the lap belt generally parallel with the door or may position the sliding latch plate at mid-length along the shoulder belt so that the latch plate will be automatically located adjacent the shoulder belt retractor when the door is closed to establish the lap belt in restraining proximity with the lower torso. A buckle assembly is mounted inboard the seat generally adjacent the shoulder belt retractor. The latch plate is manually slidable along the shoulder belt into latching engagement with the buckle to fix the length of the lap belt and thereby provide effective restraint of the occupant lower torso.

2 Claims, 3 Drawing Figures

U.S. Patent  Sep. 2, 1980  4,220,354
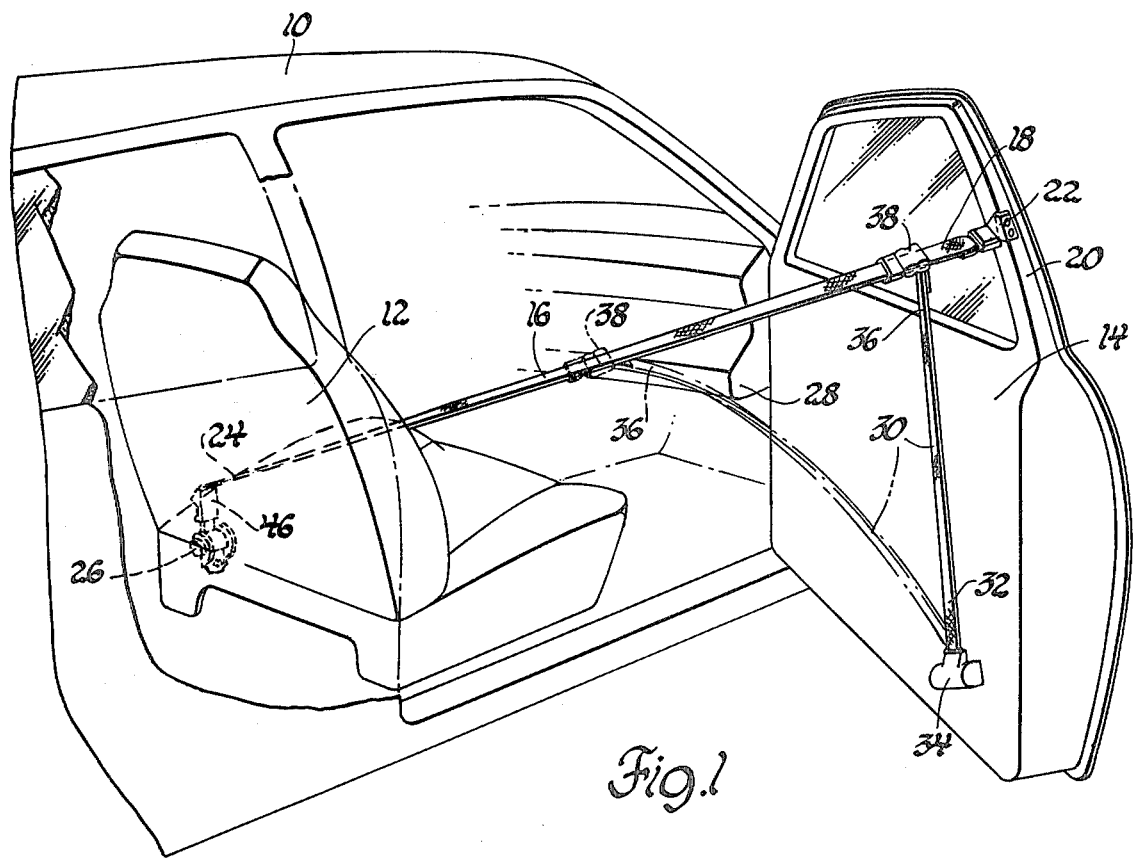
Fig.1
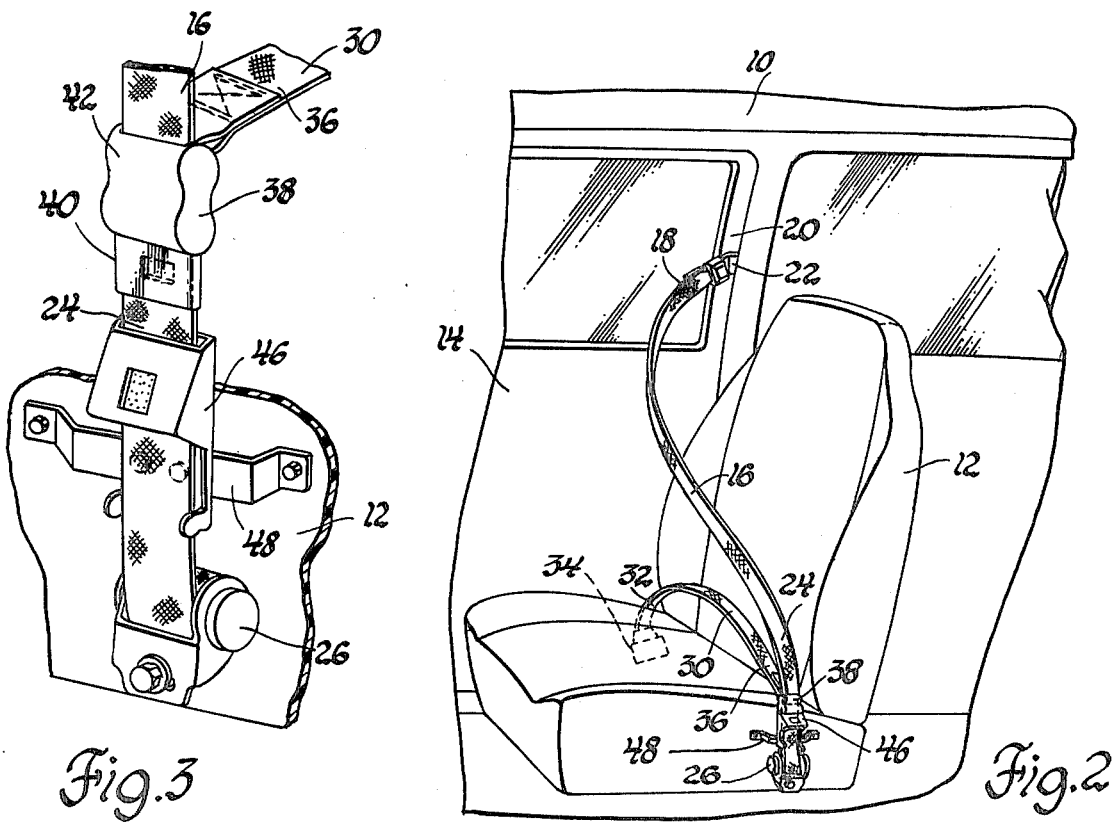
Fig.3
Fig.2

PASSIVE SEAT BELT SYSTEM

The invention relates to a passive occupant seat belt system.

BACKGROUND OF THE INVENTION

It is well known in the prior art to attach the outboard shoulder belt end on the upper rear corner of the door and to provide a retractor mounted inboard the seat for winding the inboard end of the shoulder belt. Forward swinging movement of the door to the open position automatically unwinds shoulder belt from the retractor and moves the shoulder belt outwardly and forwardly from the occupant to permit occupant ingress and egress. Rearward and inward swinging movement of the door to the closed position cooperates with winding of the belt by the retractor to establish the shoulder belt in an effective restraining position about the upper torso of the occupant.

In addition to the aforedescribed shoulder belt system, it is desirable to provide a lap belt or knee cushion for restraint of the lower torso. In this regard, it is known to provide a passive lap belt having an outboard end retractably mounted on the door and an inboard end fixedly attached to the shoulder belt so that the lap belt is automatically moved between the restraining and access positions by swinging movement of the door.

It is also known to use a conventional active lap belt system in conjunction with a passive shoulder belt. Such an active lap belt typically includes a lap belt retractor at one side of the seat and a buckle at the other side of the seat to permit the occupant to manually engage and disengage the lap belt from the restraining position.

SUMMARY OF THE INVENTION

The present invention provides a new and improved restraint belt system including a passive shoulder belt and an associated lap belt which is automatically moved into and away from restraining proximity with the occupant but which is manually buckled and unbuckled.

More particularly, according to the invention, a shoulder belt retractor is mounted inboard the occupant seat for winding the inboard end of a shoulder belt having an outboard end attached to the upper rear corner of the door. A lap belt has an outboard end mounted on the door by a lap belt retractor and an inboard end mounted on the shoulder belt by a latch plate which is slidably movable along the shoulder belt by manual effort of the occupant. The latch plate remains relatively stationary on the shoulder belt during winding and unwinding of the shoulder belt upon door movement so that the occupant may position the latch plate generally adjacent the outboard end of the shoulder belt to stow the lap belt generally parallel with the door or may position the sliding latch plate at mid-length along the shoulder belt so that the latch plate will be automatically located adjacent the shoulder belt retractor when the door is closed to establish the lap belt in restraining proximity with the lower torso. A buckle assembly is mounted inboard the seat generally adjacent the shoulder belt retractor. The latch plate is manually slidable along the shoulder belt into latching engagement with the buckle to fix the length of the lap belt and thereby provide effective restraint of the occupant lower torso.

The object, feature and advantage of the invention resides in the provision of a door connected passive shoulder belt in combination with a door connected lap belt having a latch plate which is manually slidable along the shoulder belt by occupant effort to effect latching of the lap belt with an inboard mounted lap belt buckle.

A further object, feature and advantage of the invention resides in a passive lap belt having a latch plate at the inboard end thereof which is manually slidable along the length of a passive door connected shoulder belt so that the lap belt may be stowed in a non-use generally vertical position along the door panel or may be manually moved along the shoulder belt into latching engagement with an inboard mounted lap belt buckle to fix the lap belt in an effective lower torso restraining position.

BRIEF DESCRIPTION OF THE DRAWINGS

These and other features, objects and advantages of the invention will become apparent upon consideration of the specification and the appended drawings in which:

FIG. 1 is a perspective view of a vehicle body having the passive occupant restraint of this invention moved forwardly to the occupant access position when the door is in the open position;

FIG. 2 is a perspective view of a vehicle body having the restraint system established in the occupant restraining position when the door is closed and the latch plate is manually engaged with the inboard mounted lap belt buckle; and FIG. 3 is an enlarged perspective view of shoulder belt retractor, lap belt buckle and latch plate.

Referring to FIG. 1 there is shown a vehicle body 10 having a seat 12 located laterally adjacent a door 14 which is hingedly mounted on the vehicle body 10 for swinging movement between an open position shown in FIG. 1 and a closed position shown in FIG. 2.

An occupant restraint system for restraining an occupant in the seat 12 includes a passive shoulder belt 16 having its outboard end 18 connected to the upper rear corner of the door window frame 20 by an anchor bracket 22. The inboard end 24 of the shoulder belt 16 is retractably mounted by a conventional shoulder belt retractor 26 which is suitably attached to the vehicle floor or to the seat inboard the occupant seating position. The retractor 26 winds and unwinds the shoulder belt 16 during movement of the door 14. When the door is in the open position of FIG. 1, the shoulder belt 16 is substantially extended from the shoulder belt retractor 26 and the outboard end 18 of the shoulder belt 16 is moved substantially outwardly and forwardly away from the occupant seat to permit occupant ingress and egress. When the door is in the closed position of FIG. 2, the shoulder belt 16 is wound by the shoulder belt retractor 26 so that shoulder belt 16 assumes a normal diagonal restraining position in close proximity with the occupant upper torso.

A knee cushion 28 is mounted forwardly of the seat for engagement by the occupant to restrain the lower torso.

Referring again to FIG. 1, it is seen that a lap belt 30 has an outboard end 32 which is connected to the lower rear corner of the door 14 by a lap belt retractor 34. The inboard or upper end 36 of the lap belt 30 is attached to a latch plate 38. As best seen in FIG. 3, the latch plate includes a stamped metal frame 40 having a passage through which the shoulder belt 16 slidably passes.

A plastic hand grip 42 is provided on the frame 40 to facilitate manual movement of the latch plate 38 along the shoulder belt 16 by manual effort of the occupant. The fit between the latch plate 38 and the shoulder belt 16 is such that the latch plate 38 is frictionally retained at any particular point along the length of the shoulder belt 16 to which it may have been moved by the occupant's manual effort.

Referring again to FIG. 3, it is seen that a push button buckle 46 is suitably attached to the side of the vehicle seat 12 by a mounting bracket 48. The buckle 46 is located generally above the shoulder belt retractor 26 and has a passage through which the shoulder belt 16 slidably passes so that the belt guides the latch plate into latching engagement with buckle 46 when the occupant manually slides the latch plate along the belt in the inboard direction.

Referring to FIG. 1, it will be understood that the occupant may slide the latch plate 38 in the outboard direction to the solid line indicated position in which the lap belt 30 is stowed in a substantially vertical position in generally parallel relation with the door 14. However, if and when the occupant wishes the added security of having the lap belt 30 engaged about the lower torso, the latch plate assembly 38 may be slid inwardly along the shoulder belt 16 to the phantom-line indicated position of FIG. 1. Accordingly, when the door is closed, the winding of the shoulder belt 16 by the shoulder belt retractor 26 will automatically move the latch plate 38 inboard into proximity with the buckle 46. The occupant may then slide the latch plate 38 the additional small inward distance along the guide path provided by the shoulder belt from the position of FIG. 3 to the position of FIG. 2 to engage the latch plate 38 with the buckle 46 so that the lap belt 30 is held in the effective occupant restraining position of FIG. 2.

Thus, it is seen that the invention provides a new and improved passive occupant restraint system wherein the operation of the shoulder belt is fully passive and the lap belt will be automatically moved into locking proximity with the seat belt buckle to facilitate manual buckling of the lap belt with a minimum of occupant effort.

The embodiments of the invention in which an exclusive property or privilege is claimed are defined as follows:

1. In combination with a vehicle body having a door movable between open and closed positions laterally adjacent a seat mounted within an occupant compartment of the vehicle body, a passive belt arrangement for restraining a seated occupant comprising:

an inboard seat belt retractor mounted inboard the occupant seat;

a first restraint belt having an inboard end retractably mounted by the inboard retractor and an outboard end attached to the vehicle door so that the first restraint belt is extended from the inboard retractor to an occupant access position when the door is opened and retracted to a restraining position about the occupant when the door is closed;

a second restraint belt having an outboard end retractably mounted on the vehicle door and an inboard end;

a first buckle component mounted on the vehicle body inboard the occupant seat and generally adjacent the inboard retractor;

a second buckle component mounted on the first restraint belt for sliding movement therealong and having the inboard end of the second restraint belt attached thereto so that the second buckle component is carried with the first restraint belt during extension and retraction from the inboard retractor upon door movement and is movable by occupant effort along the first restraint belt to effect latching engagement of the second buckle component with the first buckle component to establish the second restraint belt in a restraining position.

2. In combination with a vehicle body having a door movable between open and closed positions laterally adjacent a seat mounted within an occupant compartment of the vehicle body, a passive belt arrangement for restraining a seated occupant comprising:

a shoulder belt retractor mounted inboard the occupant seat;

a shoulder belt having an inboard end retractably mounted by the inboard retractor and an outboard end attached to the vehicle door so that the shoulder belt is extended from the shoulder belt retractor to an occupant access position when the door is opened and retracted to a restraining position about the occupant when the door is closed;

a lap belt having an outboard end retractably mounted on the vehicle door and an inboard end;

a first buckle component mounted on the vehicle body inboard the occupant seat and generally adjacent the inboard retractor, said first buckle component having a passage slidably receiving the shoulder belt and permitting free sliding passage of the shoulder belt therethrough during extension and retraction of the shoulder belt from the shoulder belt retractor;

and a second buckle component attached to the inboard end of the lap belt and having a passage slidably receiving the shoulder belt in a frictionally interfering fit so that the second buckle component is normally carried with the shoulder belt during extension and retraction from the shoulder belt retractor upon door movement and is movable by occupant effort along the shoulder belt whereby the occupant may establish the second buckle component generally adjacent the outboard end to stow the lap belt in a generally vertical position alongside the door or may establish the second buckle component at midlength along the shoulder belt so that the second buckle component will automatically be established in proximity with the first buckle component when the door is closed;

said shoulder belt extending slidably through the first and second buckle components being effective to guide the second buckle component into latching engagement with the first buckle component upon manual occupant effort moving the second buckle component in the inboard direction.

* * * * *